(12) United States Patent
Ideshio et al.

(10) Patent No.: US 9,505,446 B2
(45) Date of Patent: Nov. 29, 2016

(54) POWERTRAIN UNIT

(71) Applicant: TOYOTA JIDOSHA KABUSHIKI KAISHA, Toyota-shi, Aichi-ken (JP)

(72) Inventors: Yukihiko Ideshio, Nisshin (JP); Masahiro Kojima, Okazaki (JP); Toshihiko Kamiya, Toyota (JP); Takayuki Abe, Toyota (JP); Akira Iida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/067,698

(22) Filed: Mar. 11, 2016

(65) Prior Publication Data

US 2016/0304132 A1    Oct. 20, 2016

(30) Foreign Application Priority Data

Apr. 15, 2015 (JP) .................................. 2015-083411
Aug. 21, 2015 (JP) .................................. 2015-163801

(51) Int. Cl.
*B62D 25/20* (2006.01)

(52) U.S. Cl.
CPC .................................. *B62D 25/2072* (2013.01)

(58) Field of Classification Search
CPC .......................... F16N 31/006; B62D 25/2072
See application file for complete search history.

(56) References Cited

U.S. PATENT DOCUMENTS

| | | | | |
|---|---|---|---|---|
| 2,931,453 | A | * | 4/1960 | Ingless ................... F01M 11/04 180/69.1 |
| 3,815,702 | A | * | 6/1974 | Paananen ............... F16N 31/006 180/69.1 |
| 2013/0011092 | A1 | | 1/2013 | Yamada et al. |
| 2014/0262584 | A1 | | 9/2014 | Lovold et al. |
| 2014/0306491 | A1 | | 10/2014 | Sirbu et al. |

FOREIGN PATENT DOCUMENTS

| | | |
|---|---|---|
| JP | 2014-184923 A | 10/2014 |
| WO | 2011/121638 A1 | 10/2011 |

* cited by examiner

*Primary Examiner* — John Walters
*Assistant Examiner* — James Triggs
(74) *Attorney, Agent, or Firm* — Oliff PLC

(57) ABSTRACT

A powertrain unit includes an engine and a power transmission device that transmits drive force of the engine to a drive wheel of a vehicle, the power transmission device including a transmission provided in a power transmission path between the engine and the drive wheel. An oil pan is provided below the transmission. A guard member covering at least a portion of the oil pan from below is provided below the oil pan. The guard member has a first end secured to a portion of the powertrain unit which is located in front of the transmission in a vehicle longitudinal direction, and has a second end, opposite the first end, secured to a portion of the powertrain unit which is located behind the transmission in the vehicle longitudinal direction. The rigidity of the powertrain unit is improved by utilizing the rigidity of the guard member.

7 Claims, 8 Drawing Sheets

POWERTRAIN UNIT

This nonprovisional application is based on Japanese Patent Application No. 2015-083411 filed on Apr. 15, 2015, and No. 2015-163801 filed on Aug. 21, 2015, with the Japan Patent Office, the entire contents of which are hereby incorporated by reference.

BACKGROUND

Technical Field

The disclosure relates to a powertrain unit mounted on a vehicle.

Background Art

An oil pan is disposed below a powertrain unit. A guard member is provided below the oil pan in order to prevent contact between the oil pan and a road surface, and to protect the oil pan from flying rocks. WO 2011/121638 discloses providing an under guard between cross members.

SUMMARY

A guard member has a certain rigidity in order to protect an oil pan. It is assumed that a guard member is provided at a position away from a powertrain unit. For example, if a guard member is secured only to cross members disposed below a powertrain unit, the rigidity of the guard member does not contribute to improving the rigidity of the powertrain unit.

An object of disclosed embodiments is to provide a powertrain unit capable of achieving an improved rigidity by utilizing the rigidity of a guard member.

A powertrain unit includes an engine and a power transmission device that transmits drive force of the engine to a drive wheel of the vehicle. The power transmission device includes a transmission provided in a power transmission path between the engine and the drive wheel, an oil pan provided below the transmission, and a guard member covering at least a portion of the oil pan from below provided below the oil pan. The guard member has one end secured to a portion of the powertrain unit which is located in front of the transmission in a vehicle longitudinal direction, and has another end secured to a portion of the powertrain unit which is located behind the transmission in the vertical longitudinal direction.

According to the configuration described above, since the guard member is secured to the powertrain unit, the rigidity of the powertrain unit is improved by utilizing the rigidity of the guard member.

Preferably, the guard member is secured also to a cross member. According to the configuration described above, a load input to the guard member is partially received by the cross member, thereby reducing a load (impact) input to the powertrain unit. If the powertrain unit incorporates a speed sensor, for example, a load input to the speed sensor is also reduced, thereby suppressing erroneous detection by the speed sensor of the speeds of an input shaft and an output shaft of the transmission. The same is true for when the powertrain unit is provided with a range position sensor or a hydraulic switch.

Preferably, the guard member is secured to a lower surface of the cross member. According to the configuration described above, a load acting on the guard member (an upward load in a direction of gravity) is directly received by the cross member.

According to the configuration described above, since the guard member is secured to the powertrain unit, the rigidity of the powertrain unit can be improved by utilizing the rigidity of the guard member.

The foregoing and other objects, features, aspects and advantages of the embodiments will become more apparent from the following detailed description when taken in conjunction with the accompanying drawings.

DESCRIPTION OF PREFERRED EMBODIMENTS

Embodiments will be hereinafter described with reference to the drawings. The same or corresponding components are designated by the same reference numbers, and redundant description are not repeated.

[First Embodiment]

Figure 1:
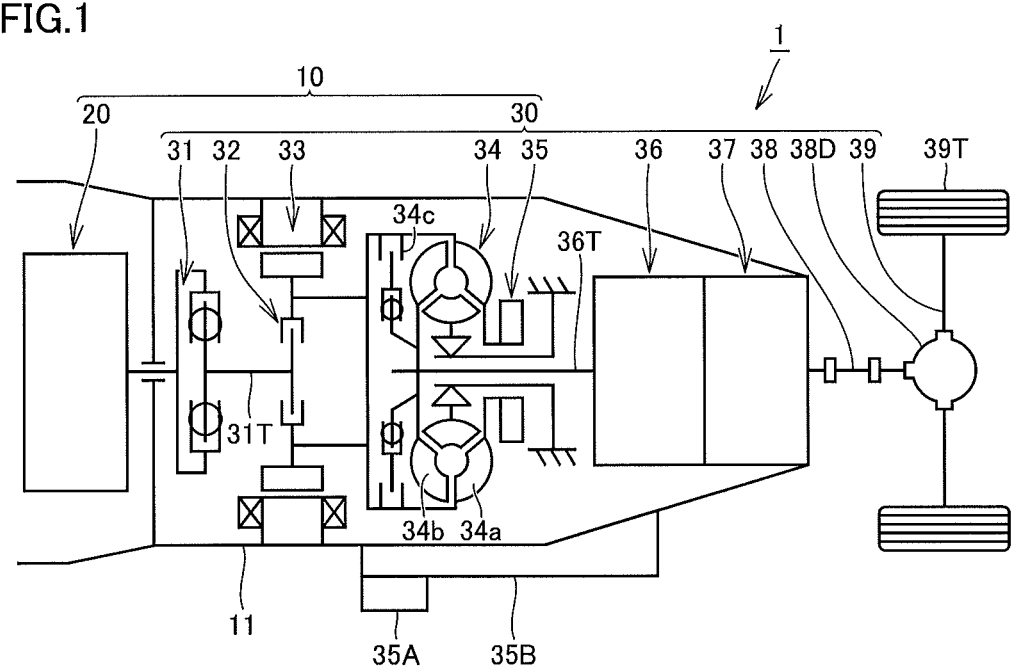
FIG. 1 is a skeleton diagram showing a powertrain unit in a first embodiment.

FIG. 1 is a skeleton diagram showing a powertrain unit 10 in a first embodiment: Powertrain unit 10 of this embodiment is mounted on a hybrid vehicle 1. Powertrain unit 10 includes an engine 20 and a power transmission device 30.

Engine 20 generates a drive force by being driven by fuel combustion in the engine. A gasoline engine, a diesel engine or the like can be used as engine 20. Power transmission device 30 includes a transmission 36 and the like, and transmits the drive force of engine 20 to a drive wheel 39T.

Power transmission device 30 of this embodiment includes a damper device 31, a clutch 32, a rotating electric machine 33, a torque converter 34, an oil pump 35, a transmission 36, a transfer 37, a propeller shaft 38, a differential gear 38D, and an axle 39. Damper device 31, clutch 32, rotating electric machine 33, torque converter 34, oil pump 35, transmission 36, and transfer 37 are placed in a case 11 (see also FIG. 2).

Clutch 32 is drive-connected via damper device 31 to engine 20. The drive-connection is a state in which two rotating elements are connected to each other so as to be able to transmit a drive force, which includes a state in which the two rotating elements are connected to each other so as to be able to rotate together, and a state in which the two rotating elements are connected to each other so as to be able to transmit a drive force via one, two or more transmission members.

When clutch 32 is engaged, the drive force of engine 20 is transmitted via damper device 31 to an input shaft 31T. A drive force of input shaft 31T is transmitted via clutch 32 to torque converter 34. Torque converter 34 has a pump impeller 34a, a turbine impeller 34b, and a lockup clutch 34c. Pump impeller 34a of torque converter 34 rotates around a shaft center with the drive force received from engine 20. A drive force of pump impeller 34*a* is transmitted via fluid to transmission 36 (to an input shaft 36T of transmission 36).

Turbine impeller 34*b* of torque converter 34 is connected to input shaft 36T of transmission 36. Lockup clutch 34*c* is provided between pump impeller 34*a* and turbine impeller 34*b*. The drive force input via torque converter 34 to input shaft 36T of transmission 36 is transmitted successively via transfer 37, propeller shaft 38, differential gear 38D and axle 39, to drive wheel 39T.

Rotating electric machine 33 is drive-connected to clutch 32. Transmission 36 is provided in a power transmission path between engine 20 and drive wheel 39T, and specifically, is drive-connected to rotating electric machine 33. Rotating electric machine 33 selectively functions as a motor that generates a mechanical drive force from electric energy, and functions as a power generator that generates electric energy from mechanical energy. That is, rotating electric machine 33 is a motor-generator. During travel using rotating electric machine 33 as a source of a drive force for travel, clutch 32 is disengaged, and the drive force of rotating electric machine 33 is transmitted successively via torque converter 34, transmission 36, transfer 37, propeller shaft 38, differential gear 38D and axle 39, to drive wheel 39T.

Oil pump 35 is connected to pump impeller 34*a*, and generates a hydraulic fluid pressure by being driven to rotate by engine 20 or rotating electric machine 33. Oil pump 35 controls gear shifting of transmission 36 via a valve body, controls a torque capacity of lockup clutch 34*c*, controls engagement/disengagement of clutch 32, supplies a lubricant to each unit (such as transmission 36) in the power transmission path of hybrid vehicle 1, and so on. The same oil (ATF: Automatic Transmission Fluid) is used for these control operations and for the lubrication.

Power transmission device 30 of this embodiment also includes an electrically powered oil pump 35A which is driven by a not-shown electric motor. When oil pump 35 is not driven, for example, when the vehicle stops, the hydraulic pressure is generated by operating electrically powered oil pump 35A in an auxiliary manner. In this embodiment, driving of oil pumps 35, 35A is controlled by a hydraulic control circuit 35B provided in power transmission device 30. It is noted that oil pumps 35, 35A are not essential components.

Figure 2:
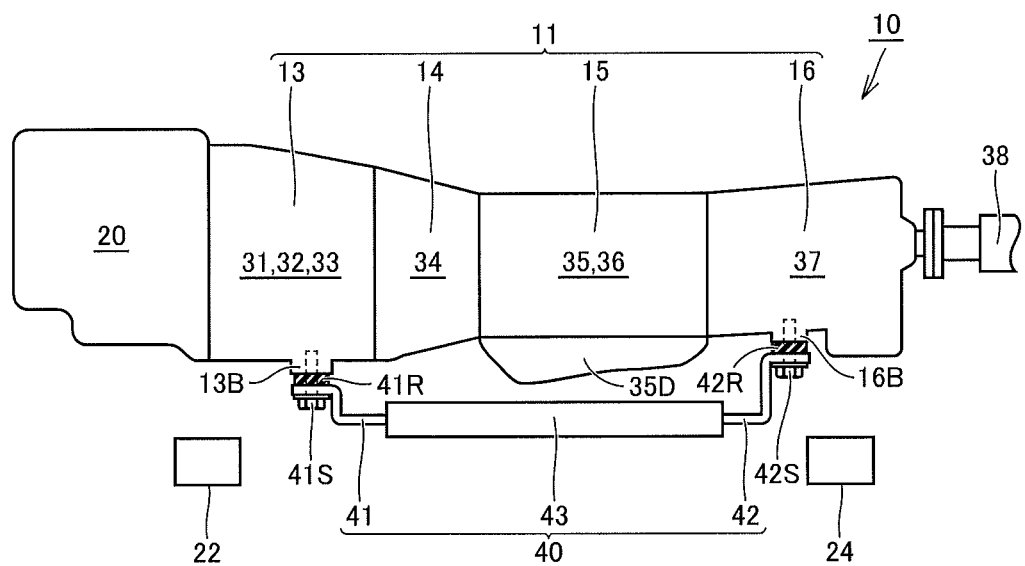
FIG. 2 is a side view showing the powertrain unit in the first embodiment.

FIG. 2 is a side view showing powertrain unit 10. A horizontal direction in the plane of the drawing of FIG. 2 corresponds to a vehicle longitudinal direction of the hybrid vehicle. As described above, powertrain unit 10 includes case 11 and engine 20. Case 11 of this embodiment includes sub-cases 13 to 16. Engine 20 and sub-cases 13 to 16 are connected together and arranged side by side successively in a direction from the front toward the rear of the vehicle. All of engine 20 and sub-cases 13 to 16 of this embodiment are located above a level of cross members 22, 24 of the vehicle.

Referring to FIGS. 1 and 2, damper device 31, clutch 32 and rotating electric machine 33 are housed in sub-case 13. Torque converter 34 is housed in sub-case 14. Oil pump 35 and transmission 36 are housed in sub-case 15 (sub-case 15 functions as a so-called transmission case). Transfer 37 is housed in sub-case 16 (sub-case 16 functions as a so-called transfer case).

Here, an oil pan 35D made of iron is provided below sub-case 15 (transmission case) housing transmission 36. Oil pan 35D houses the valve body, and stores oil (which includes a hydraulic fluid for control) supplied to transmission 36 and the like. A guard member 40 covering at least a portion of oil pan 35D from below is provided below oil pan 35D.

Guard member 40 has one end (a connection portion 41 which will be described later) secured to a portion of powertrain unit 10 which is located in front of transmission 36 (sub-case 15) in the vehicle longitudinal direction. Guard member 40 has another opposite end (a connection portion 42 which will be described later) secured to a portion of powertrain unit 10 which is located behind transmission 36 (sub-case 15) in the vehicle longitudinal direction. This will be described below in more detail.

In this embodiment, guard member 40 includes connection portions 41, 42, and a protection portion 43. Protection portion 43 is plate-shaped and made of a steel plate or the like. Connection portion 41 is disposed in front of protection portion 43 in the vehicle longitudinal direction, and connection portion 42 is disposed behind protection portion 43 in the vehicle longitudinal direction. Sub-case 13 has a boss portion 13B, and sub-case 16 has a boss portion 16B. A buffer 41R such as rubber is provided between connection portion 41 and boss portion 13B, and a buffer 42R such as rubber is provided between connection portion 42 and boss portion 16B.

Connection portions 41, 42 are secured to boss portions 13B, 16B by bolts 41S, 42S, respectively. That is, guard member 40 has one end (front end) secured to a portion of powertrain unit 10 which is located in front of transmission 36 (or oil pan 35D) in the vehicle longitudinal direction, and has the other end (rear end) secured to a portion of powertrain unit 10 which is located behind transmission 36 (or oil pan 35D) in the vehicle longitudinal direction.

(Function and Effect)

As was also mentioned at the beginning, guard member 40 has a prescribed rigidity in order to protect oil pan 35D. With guard member 40 secured to powertrain unit 10, the rigidity of powertrain unit 10 is improved by utilizing the rigidity of guard member 40.

In powertrain unit 10 including rotating electric machine 33, such as in this embodiment, rotating electric machine 33 is often disposed in front of transmission 36 in the vehicle longitudinal direction (see FIG. 1). When such a structure is employed, the total length of powertrain unit 10 in the vehicle longitudinal direction tends to be longer than that of a powertrain unit not including rotating electric machine 33. While the rigidity can be improved by securing case 11 (sub-cases 13 to 16) to a not-shown frame or member, the rigidity of powertrain unit 10 can be further improved by utilizing the rigidity of guard member 40 as in this embodiment, which is an advantageous effect unattainable in the past. Utilizing the rigidity of guard member 40 may eliminate the need for reinforcement members for increasing the rigidity of powertrain unit 10. In this case, the number of components and manufacturing costs can also be reduced.

By increasing the rigidity of powertrain unit 10 (the mass as a vibrating body), such as in this embodiment, the occurrence of noise resulting from resonance can also be suppressed. Generally, in a four-wheel drive vehicle, a resonance frequency of a powertrain unit formed of an engine, a clutch, a transmission, a transfer and the like is often within a normal speed range of the vehicle. While the engine and the transmission are provided with an insulator, noise resulting from resonance may not be sufficiently suppressed only by the insulator. By increasing the rigidity of powertrain unit 10 (the mass as a vibrating body), noise resulting from resonance can also be reduced.

COMPARATIVE EXAMPLE

Figure 3:
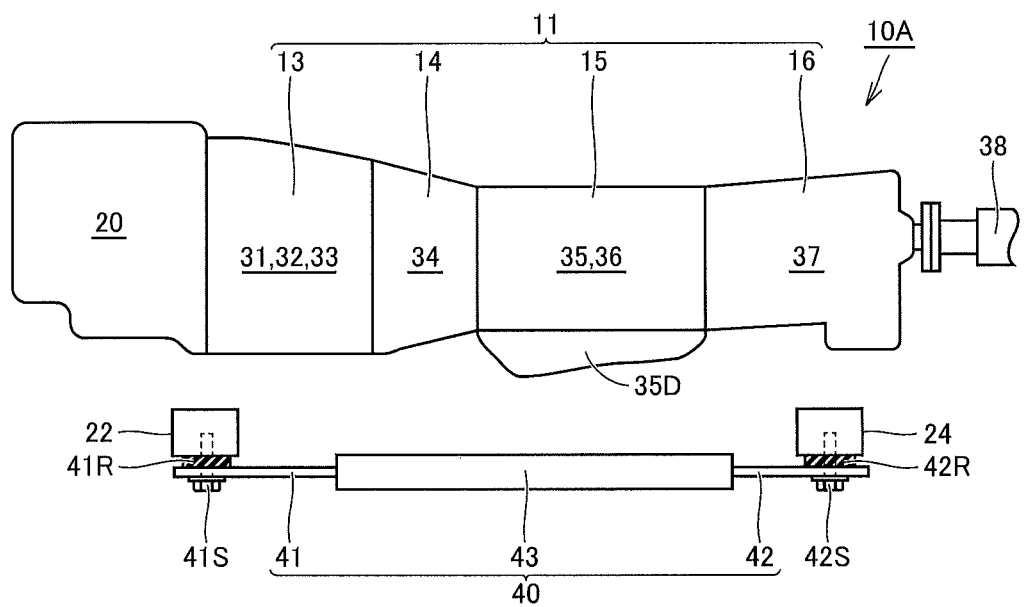
FIG. 3 is a side view showing a powertrain unit in a comparative example.

FIG. 3 is a side view showing a powertrain unit 10A in a comparative example. In the comparative example, guard member 40 is disposed at a position away from powertrain unit 10A, and is secured only to cross members 22, 24 using bolts 41S, 42S. In this case, the rigidity of the guard member does not contribute to improving the rigidity of the powertrain unit, resulting in inability to provide the effect as was described in the above first embodiment.

To provide running stability of a vehicle, the vehicle may be designed to have a lower center of gravity. In this case, the level position of oil pan 35D is also lowered, resulting in a smaller gap between oil pan 35D and guard member 40. In the configuration of the comparative example, oil pan 35D and guard member 40 move relative to each other in a height direction (direction of gravity). A generous gap in the height direction thus needs to be provided in order to prevent contact between oil pan 35D and guard member 40.

In the configuration of the first embodiment described above (see FIG. 2), on the other hand, oil pan 35D and guard member 40 barely move relative to each other in the height direction (direction of gravity) because guard member 40 is secured to powertrain unit 10. In the first embodiment, therefore, the gap between oil pan 35D and guard member 40 can be made smaller than the gap in the comparative example, and the center of gravity can also be made lower than that in the comparative example.

[Second Embodiment]

Figure 4:
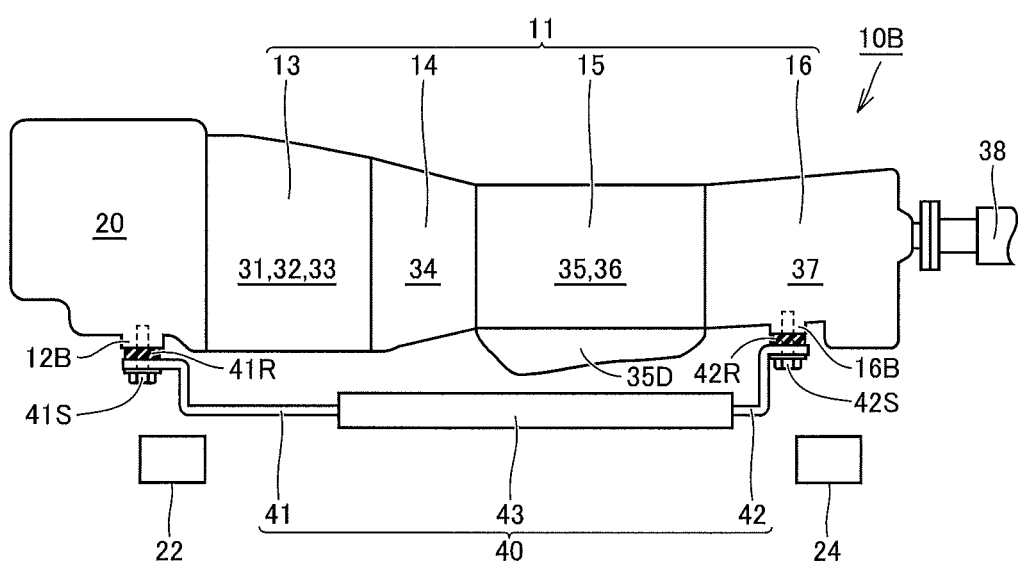
FIG. 4 is a side view showing a powertrain unit in a second embodiment.

FIG. 4 is a side view showing a powertrain unit 10B in a second embodiment. This embodiment is different from the first embodiment in that the one end (connection portion 41) of guard member 40 is secured to a boss portion 12B provided on engine 20.

In this configuration, too, the one end (connection portion 41) of guard member, 40 is secured to a portion of powertrain unit 10B which is located in front of transmission 36 (sub-case 15) in the vehicle longitudinal direction. The other end (connection portion 42) of guard member 40 is secured to a portion of powertrain unit 10B which is located behind transmission 36 (sub-case 15) in the vehicle longitudinal direction. Thus, a function and effect substantially similar to that of the first embodiment described above can be provided.

In the first embodiment, the one end (connection portion 41) of guard member 40 is secured to sub-case 13 housing clutch 32 and rotating electric machine 33. In the second embodiment, the one end of guard member 40 is secured to engine 20. Without being limited to these configurations, the one end of guard member 40 can be secured to any position as long as it is a portion located in front of transmission 36 (sub-case 15) in the vehicle longitudinal direction. For example, the one end of guard member 40 may be secured to sub-case 14 housing torque converter 34. Alternatively, the one end of guard member 40 may be secured to sub-case 15 housing oil pump 35 and transmission 36, as long as it is a portion in front of oil pan 35D in the vehicle longitudinal direction.

In the first and second embodiments, the other end (connection portion 42) of guard member 40 is secured to sub-case 16 housing transfer 37. Without being limited to these configurations, the other end of guard member 40 can be secured to any position as long as it is a portion located behind transmission 36 (sub-case 15) in the vehicle longitudinal direction. For example, the other end of guard member 40 may be secured to sub-case 15 housing oil pump 35 and transmission 36, as long as it is a portion behind oil pan 35D in the vehicle longitudinal direction. If an adapter is provided between sub-case 15 and sub-case 16, the other end of guard member 40 may be secured to this adapter.

[Third Embodiment]

Figure 5:
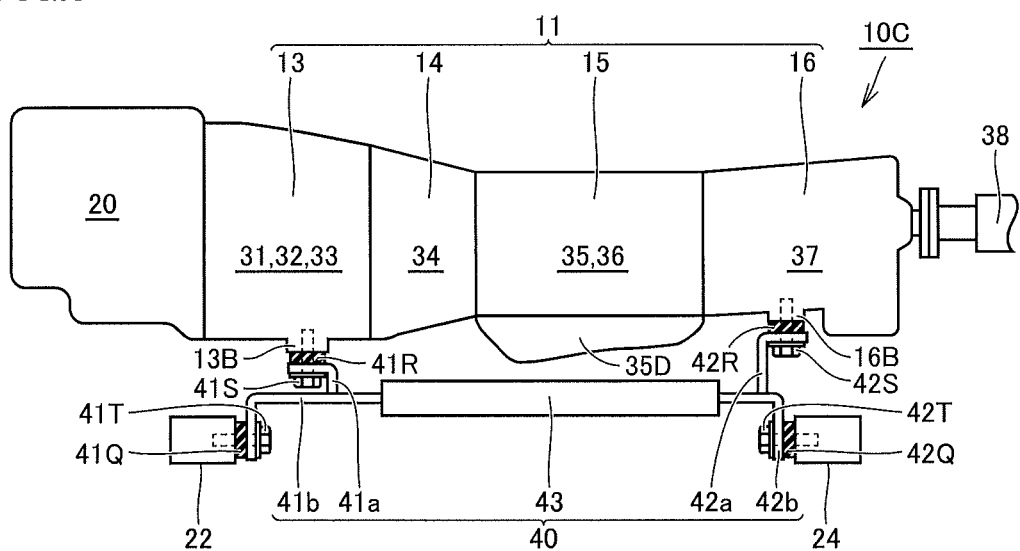
FIG. 5 is a side view showing a powertrain unit in a third embodiment.

FIG. 5 is a side view showing a powertrain unit 10C in a third embodiment. This embodiment is different from the first and second embodiments in that the one end of guard member 40 also is secured to cross member 22, and the other end of guard member 40 also is secured to cross member 24.

Guard member 40 of this embodiment has connection portions 41a, 41b on one end side (front side) and connection portions 42a, 42b on the other end side (rear side). Connection portions 41a, 42a are secured to boss portions 13B, 16B by bolts 41S, 42S, respectively. On the other hand, a buffer 41Q such as rubber is provided between connection portion 41b and cross member 22, and a buffer 42Q such as rubber is provided between connection portion 42b and cross member 24. Connection portions 41b, 42b are secured to side surfaces of cross members 22, 24 by bolts 41T, 42T, respectively.

In the cases of the first and second embodiments described above (see FIGS. 2 and 4), a load input to guard member 40 directly acts on the powertrain unit. In the case of this embodiment, on the other hand, a load input to guard member 40 is partially received by cross members 22, 24. Thus, a load (impact) input to powertrain unit 10C can be reduced to further improve the rigidity of powertrain unit 10C, with the effect such that the detection accuracy of sensors incorporated in powertrain unit 10C can be improved. Although both the one end (front end) and the other end (rear end) of guard member 40 are secured to the cross members in this embodiment, only one of them may be secured to a cross member.

[Fourth Embodiment]

Figure 6:
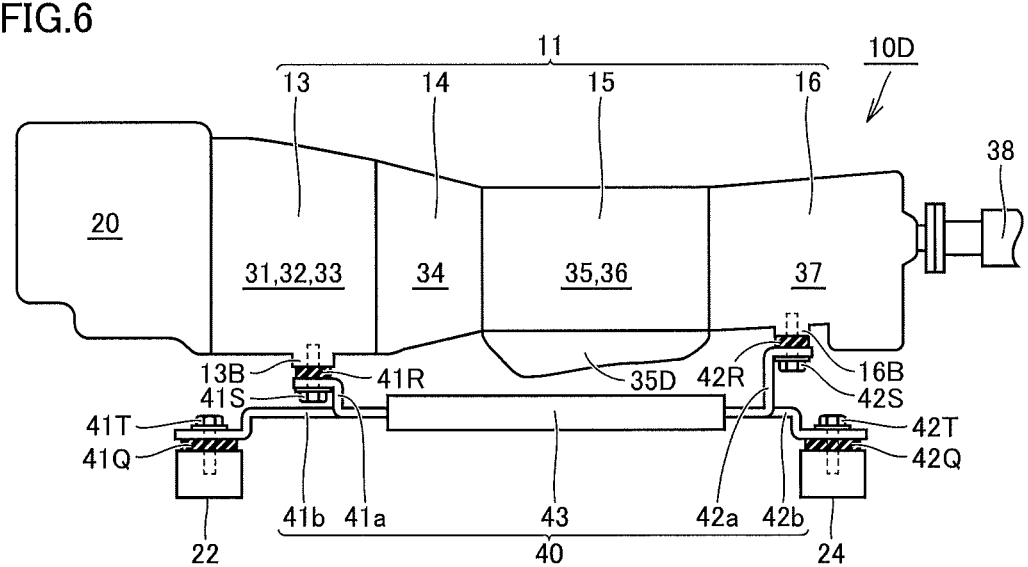
FIG. 6 is a side view showing a powertrain unit in a fourth embodiment.

FIG. 6 is a side view showing a powertrain unit 10D in a fourth embodiment. This embodiment is different from the third embodiment in that the one end of guard member 40 is secured to an upper surface of cross member 22 and the other end of guard member 40 is secured to an upper surface of cross member 24. With this configuration, too, a function and effect similar to that of the third embodiment described above can be provided.

[Fifth Embodiment]

Figure 7:
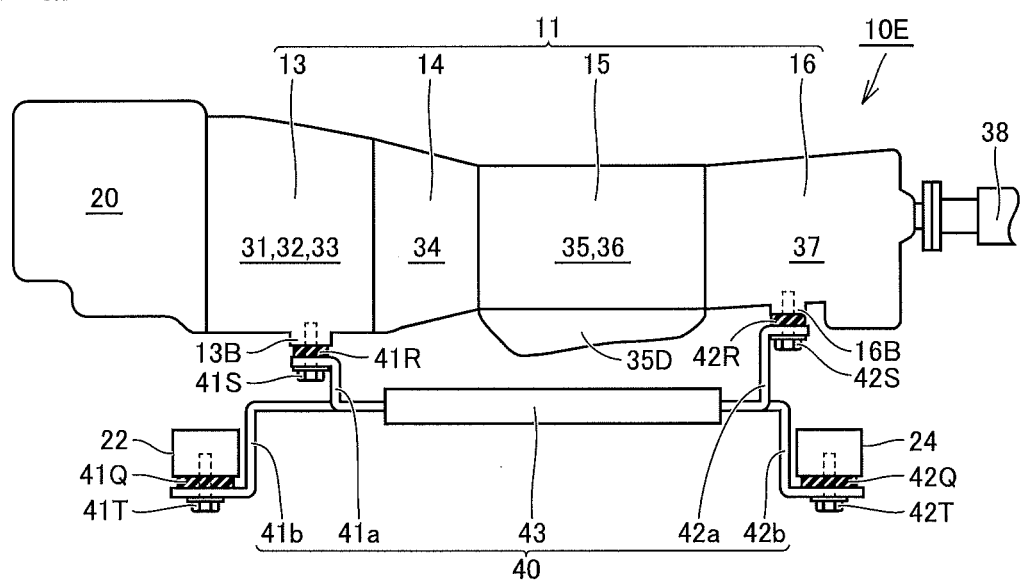
FIG. 7 is a side view showing a powertrain unit in a fifth embodiment.

FIG. 7 is a side view showing a powertrain unit 10E in a fifth embodiment. This embodiment is different from the fourth embodiment in that the one end of guard member 40 is secured to a lower surface of cross member 22 and the other end of guard member 40 is secured to a lower surface of cross member 24.

In the fourth embodiment described above (FIG. 6), a load acting on guard member 40 acts on cross members 22, 24 via bolts 41T, 42T. In this embodiment (FIG. 7), on the other hand, connection portion 41b is secured to the lower surface of cross member 22, and connection portion 42b is secured to the lower surface of cross member 24. A load acting on guard member 40 (an upward load in the direction of gravity) can be directly received by cross members 22, 24. In other words, cross members 22, 24 have a sufficiently high strength so as to support the load of the vehicle, and cross members 22, 24 can directly receive the load acting on guard member 40 to thereby reduce a load acting on powertrain unit 10E.

Although both the one end (front end) and the other end (rear end) of guard member 40 are secured to the lower surfaces of the cross members in this embodiment, only one of them may be secured to the lower surface of the cross member. The one end (front end) and/or the other end (rear end) of guard member 40 may be secured to one, two, or all three of the upper surface, side surface and lower surface of the cross member.

[Sixth Embodiment]

Figure 8:
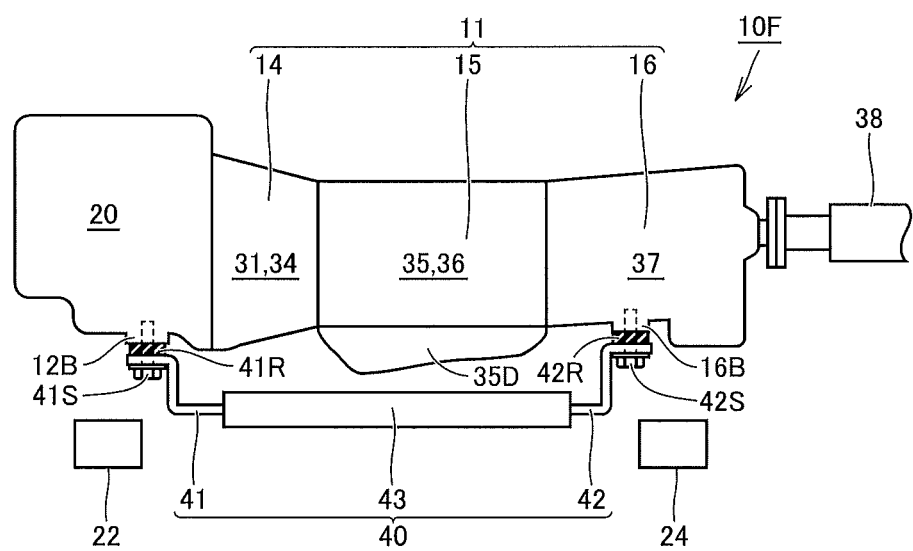
FIG. 8 is a side view showing a powertrain unit in a sixth embodiment.

FIG. 8 is a side view showing a powertrain unit 10F in a sixth embodiment. The powertrain units in the first to fifth embodiments described above are applied to a so-called hybrid vehicle, and all of them include a rotating electric machine or a clutch. Powertrain unit 10F of this embodiment is different from the first to fifth embodiments described above in that it does not include a rotating electric machine and a clutch, and is applied to a vehicle that runs only with an engine. Thus, powertrain unit 10F does not include sub-case 13 for housing rotating electric machine 33 and clutch 32. Although damper device 31 and torque converter 34 are placed in the same sub-case 14 in the configuration shown in FIG. 8, they may be placed in separate sub-cases. For example, damper device 31 may be placed in sub-case 14 (torque converter case) or in sub-case 15 (transmission case). These placement variations of damper device 31 can also be applied to the first to fifth embodiments described above.

In this embodiment, too, the one end (connection portion 41) of guard member 40 is secured to a portion of powertrain unit 10F which is located in front of transmission 36 (sub-case 15) in the vehicle longitudinal direction. The other end (connection portion 42) of guard member 40 is secured to a portion of powertrain unit 10F which is located behind transmission 36 (sub-case 15) in the vehicle longitudinal direction. With guard member 40 secured to powertrain unit 10F, the rigidity of powertrain unit 10F can be improved by utilizing the rigidity of guard member 40.

[Other Embodiments]

Although all of the powertrain units in the first to sixth embodiments described above include transfer 37, transfer 37 is not an essential component. The technical concept disclosed in each of the embodiments described above can also be applied to a powertrain unit not including transfer 37 (namely, a two-wheel drive vehicle).

Although all of the powertrain units in the first to fifth embodiments described above include one rotating electric machine 33, the technical concept disclosed in each of the embodiments described above can also be applied to a powertrain unit including two rotating electric machines.

Although preferred embodiments have been described and illustrated in detail, it is clearly understood that the same is by way of illustration and example only and is not to be taken by way of limitation, the scope of the present disclosure.

What is claimed is:

1. A powertrain unit comprising:
an engine; and
a power transmission device that transmits drive force of the engine to a drive wheel of a vehicle,
the power transmission device including a transmission provided in a power transmission path between the engine and the drive wheel,
an oil pan provided below the transmission,
a guard member covering at least a portion of the oil pan from below provided below the oil pan in a vehicle height direction,
the guard member having a first end secured to a portion of the powertrain unit which is located in front of the transmission in a vehicle longitudinal direction, and having a second end, opposite the first end, and secured to a portion of the powertrain unit which is located behind the transmission in the vehicle longitudinal direction, wherein
the guard member is located below the powertrain unit in the vehicle height direction, and the guard member is located above first and second cross members of the vehicle in the vehicle height direction.

2. The powertrain unit according to claim 1, wherein the guard member also is secured to at least one of the first and second cross members of the vehicle.

3. The powertrain unit according to claim 2, wherein the guard member is secured to a lower surface of the at least one of the first and second cross members.

4. The powertrain unit according to claim 1, wherein the first end of the guard member is secured to a portion of the power transmission device located in front of the transmission.

5. The powertrain unit according to claim 1, wherein the first end of the guard member is secured to the engine.

6. The powertrain unit according to claim 1, wherein the first end of the guard member also is secured to the first cross member located in front of the transmission in the vehicle longitudinal direction, and the second end of the guard member also is secured to the second cross member located behind the transmission in the vehicle longitudinal direction.

7. The powertrain unit according to claim 1, wherein the guard member has a connection portion secured to a side surface of the at least one of the first and second cross members.

* * * * *